(No Model.)
J. S. VOITEK.
ATTACHMENT FOR BICYCLES.
No. 575,787.      Patented Jan. 26, 1897.
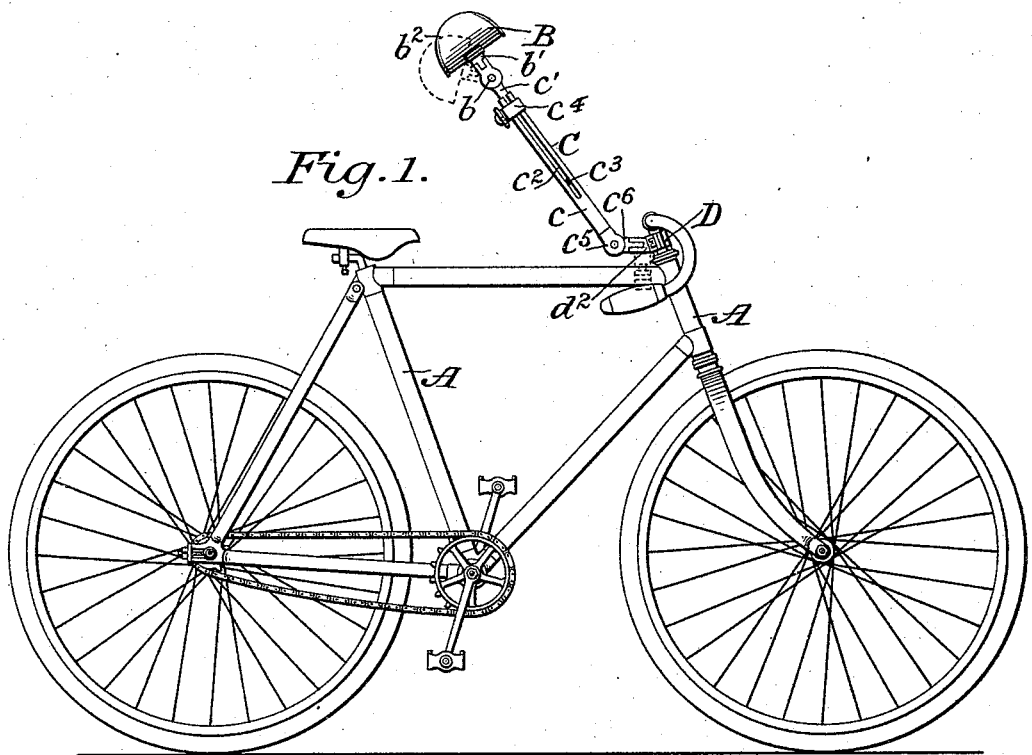
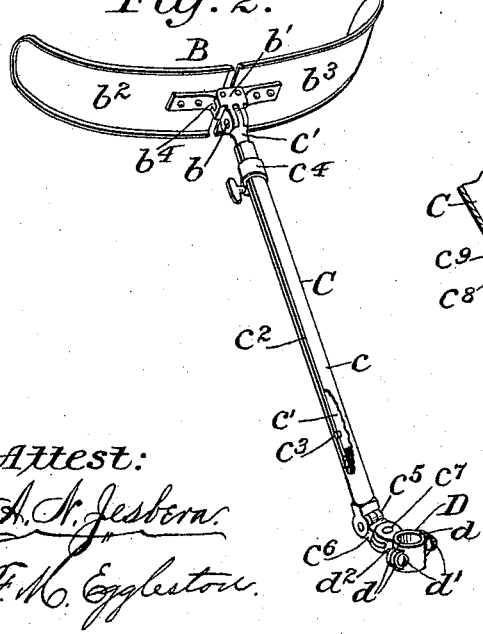
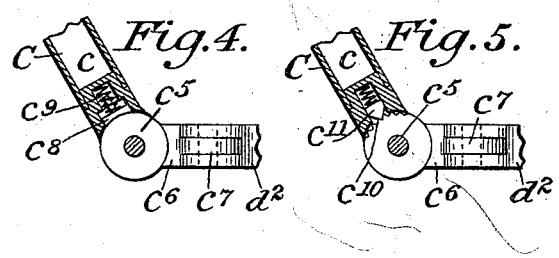
Attest:
A. N. Jesbern.
F. M. Eggleston.
Inventor:
John S. Voitek
by Redding, Kiddle & Greeley
Attys.
THE NORRIS PETERS CO., PHOTO-LITHO., WASHINGTON, D. C.

UNITED STATES PATENT OFFICE.

JOHN S. VOITEK, OF NEW YORK, N. Y.

ATTACHMENT FOR BICYCLES.

SPECIFICATION forming part of Letters Patent No. 575,787, dated January 26, 1897.

Application filed June 26, 1896. Serial No. 596,982. (No model.)

*To all whom it may concern:*

Be it known that I, JOHN S. VOITEK, a citizen of the United States, residing in the city of New York, in the county of New York and State of New York, have invented certain new and useful Improvements in Attachments for Bicycles, of which the following is a specification, reference being had to the accompanying drawings, forming a part hereof.

The natural tendency of a bicycle-rider when riding at great speed or against the wind or up an incline is to bend forward over the handle-bar in a position which is physiologically incorrect and harmful. This tendency is occasioned in large part by the lack of a brace of any sort for the upper part of the body while the handle-bars are firmly grasped and pulled upon more or less. Any rigidly-fixed and unyielding brace for the body would be objectionable, because such brace should be capable of being moved readily to permit it to be adjusted to different positions of the rider or according to different conditions of use and because it should be capable of being swung entirely out of the way when not required.

I have sought in the present invention to provide a device which can be applied readily to any bicycle to afford a suitable brace for the body of the rider and shall meet all the requirements of use of such a device.

I have fully shown the details of construction of a device which embodies my invention in the accompanying drawings, in which—

Figure 1 is a side elevation of a bicycle having my improved attachment in position thereon. Fig. 2 is a perspective view of the attachment removed from the bicycle and partly broken out to show a detail of construction. Fig. 3 is a sectional detail view of the upper part of the device. Figs. 4 and 5 are detail views, partly in section, illustrating different forms of one feature of the device.

Inasmuch as my improved attachment is capable of use with any ordinary bicycle and is independent of the construction of the frame of the bicycle it is unnecessary herein to enter into any description of the construction of a bicycle or of its frame, and I have represented in Fig. 1 of the drawings a bicycle of ordinary construction, having a frame A, also of ordinary construction. The device in which my invention consists comprises a support B for the body of the rider, an extensible rod or stem C, means for connecting the support to the rod or stem, and means for attaching the rod or stem to the frame of the bicycle, as I will proceed to describe.

The rod or stem C comprises two parts, one a tube $c$, and the other a tube or rod $c'$, which is adapted to slide within the tube $c$. The latter is preferably formed with a longitudinal slot $c^2$ to engage a pin $c^3$, secured to the rod or tube $c'$, so as to prevent rotation of the latter while permitting longitudinal movement, and the tube $c$ is also provided near its upper end with a clamping collar or sleeve $c^4$, by means of which the said tube $c$ can be clamped firmly upon the tube or rod $c'$ to retain the latter in whatever position of longitudinal adjustment is desired. To the upper end of the tube or rod $c'$ is secured by a loose or free hinge-joint $b$ to a block $b'$, which can be moved readily upon its pivot in a longitudinal direction, although the joint is preferably made tight enough to retain the block against accidental movement from the position in which it has been placed. To the block $b'$ are hinged the two parts or wings $b^2$ and $b^3$ of the support B. These wings or parts are formed and fitted to support the upper portion of the body comfortably when they are opened out, as shown clearly in Figs. 2 and 3, in which position they are held from further spreading by stops $b^4$ $b^4$, which are formed as part of the hinged joint. These wings are hinged to the block $b'$, so that they may be folded together when not in use and therefore take up less room.

The lower end of the tube $c$ is connected to a clamp D, by means of which the attachment can be secured to the bicycle-frame. This clamp is preferably in the form of a split sleeve or collar, the two parts of which have lugs or ears $d\,d$ for the reception of screws $d'$, by which the two parts are held together and clamped firmly, either about the stem of the handle-bar, as shown in full lines in Fig. 1, or about the upper brace or reach of the bicycle-frame, as indicated by dotted lines in Fig. 1. The rod or stem C is preferably connected to the clamp D, so that it may swing either fore and aft or laterally, and for this purpose the lower end of the tube $c$ is secured by a loose or free elbow-joint $c^5$, having a horizontal pivot, to a block $c^6$, and the latter is secured by a loose or free elbow-joint $c^7$, having a vertical pivot, to a block $d^2$, carried by the clamp D. In order to prevent accidental movement of the rod or stem C, a friction-block $c^8$ may be mounted in the lower end of the tube $c$ and be pressed upon the ear of the block $c^6$ by a spring $c^9$, as shown in Fig. 4, or the ear of the block $c^6$ may be serrated, as shown at $c^{10}$ in Fig. 5, and the block $c^{11}$ be pointed or toothed to engage the serrations in a manner to prevent accidental movement but to permit intended movement.

When in use, my attachment occupies about the position represented in Fig. 1, so that the rider may press his body firmly upon the support B, and thereby not only maintain a reasonably erect position, but obtain a brace which will enable him to exert more power upon the pedals. Should it be necessary for him to dismount suddenly, the brace will swing to one side or the other upon the joint $c^7$. The joints $b$ and $c^5$, together with the fastening of the rod or stem C for adjustment in length, permit the support B to be placed in that position in which it will be most effective. When the bicycle is not in use, the wings $b^2$ $b^3$ can be folded together and the whole device placed approximately parallel with and close to the upper brace of the frame, where it will be out of the way. The whole device can be made very light and yet strong and will be found extremely advantageous both for the purpose of causing the rider to maintain a reasonably erect position and for the purpose of enabling him to apply more force to the propulsion of his vehicle.

I claim as my invention—

1. In a device of the character described, the combination of a clamp to be secured to a bicycle-frame, a rod connected to said clamp by a loose or free hinge-joint, a block secured to the upper end of said rod by a loose or free hinge-joint, and a support secured to said block, substantially as shown and described.

2. In a device of the character described, the combination of a clamp to be secured to a bicycle-frame, a block secured to said clamp by a loose or free hinge-joint, with a substantially vertical pivot, a rod secured to said block by a loose or free hinge-joint with a substantially horizontal pivot, and a support secured to the upper end of said rod, substantially as shown and described.

This specification signed and witnessed this 24th day of June, A. D. 1896.

JOHN S. VOITEK.

In presence of—
W. B. GREELEY,
MIRON WINSLOW.